Jan. 31, 1928.  C. H. MILLER  1,657,514

MOTOR DRIVEN LAWN MOWER

Filed Nov. 20, 1925   3 Sheets-Sheet 1

Inventor
CARL H. MILLER
By Fisher, Mesen & Moore
Attorney

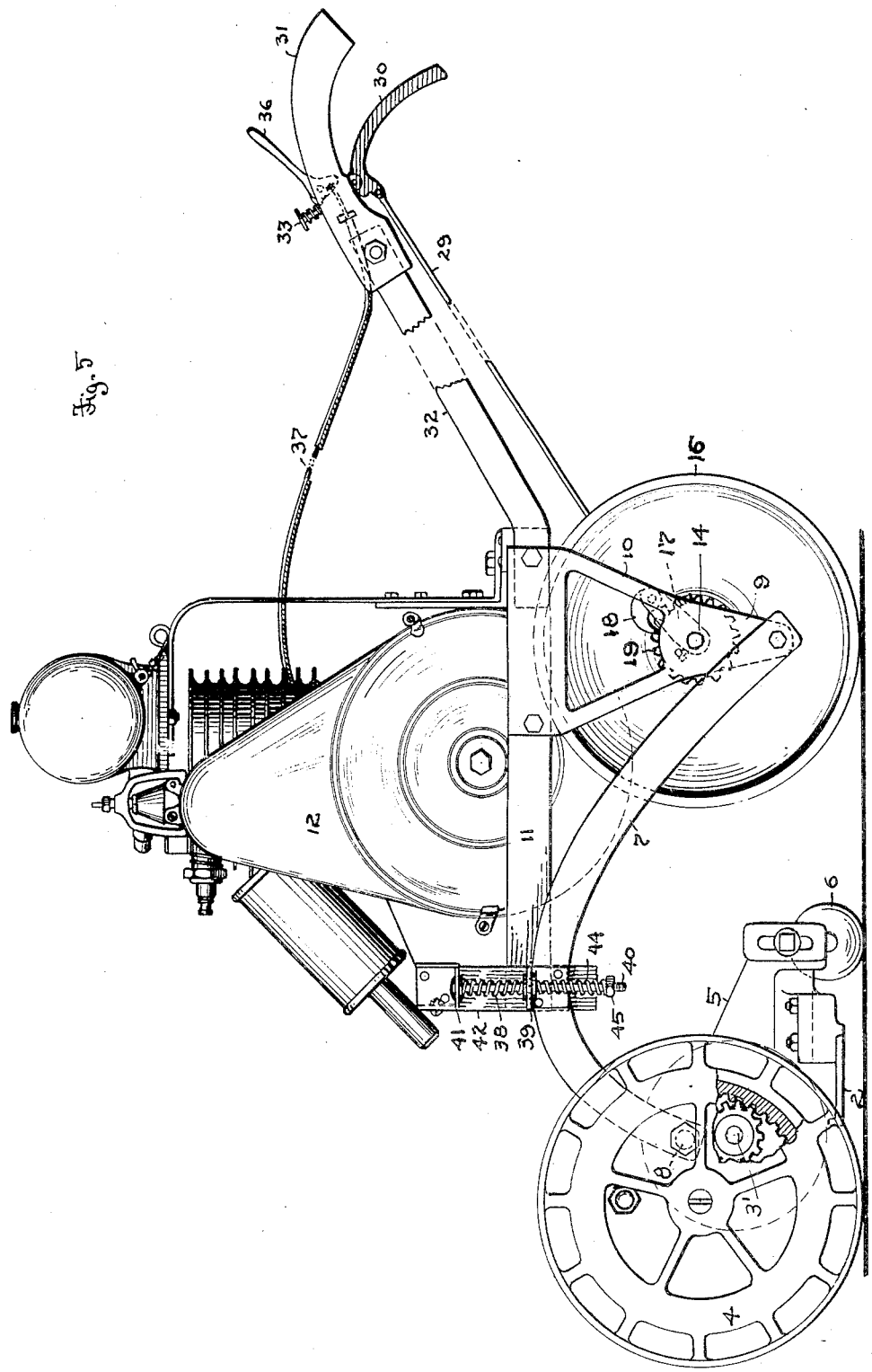

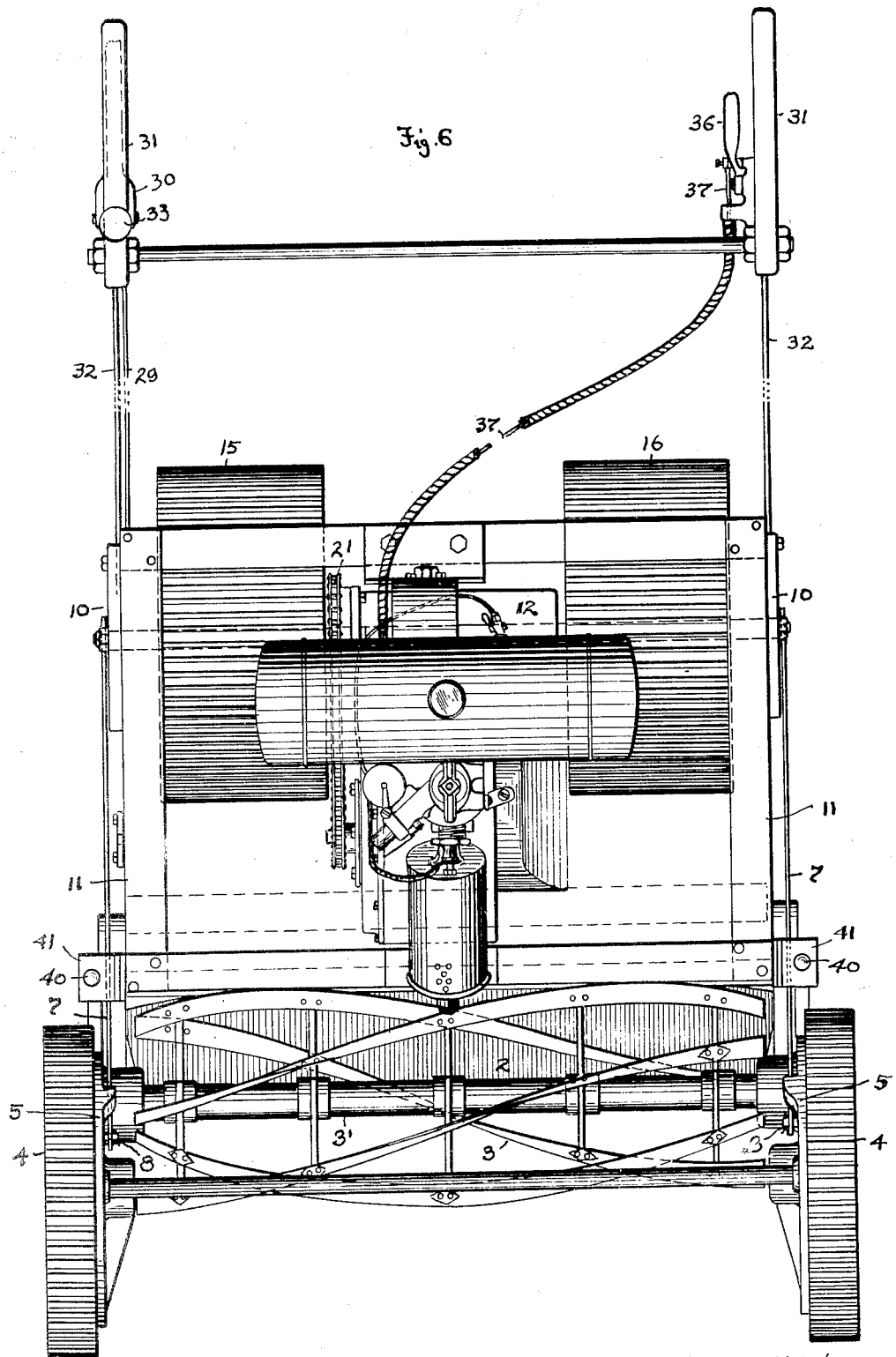

Patented Jan. 31, 1928.

1,657,514

UNITED STATES PATENT OFFICE.

CARL H. MILLER, OF CLEVELAND, OHIO.

MOTOR-DRIVEN LAWN MOWER.

Application filed November 20, 1925. Serial No. 70,261.

My invention relates to an improvement in a motor driven lawn mower, my object in general being to combine a steering and mower propelling unit, with a lawn mower having a rotary cutter and traction wheels, all substantially as hereinafter shown and described and more concisely pointed out in the claims, whereby constant traction may be obtained for the cutter-operating wheels, and the steering movements and travel of the entire apparatus may be readily controlled and manipulated without laborious effort on the part of the operator.

Figure 1:
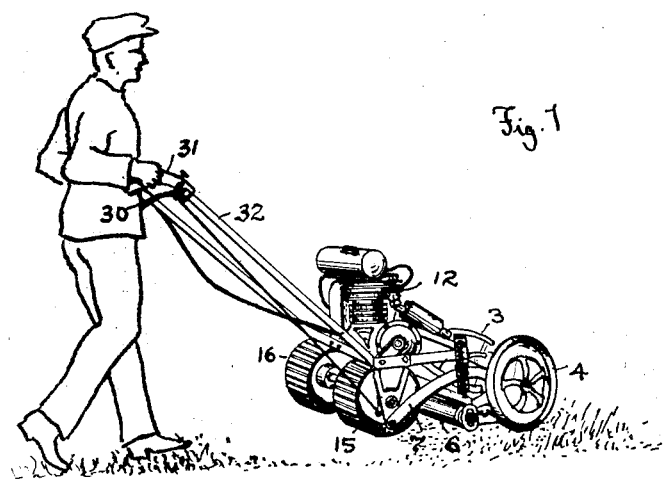
Figure 2:
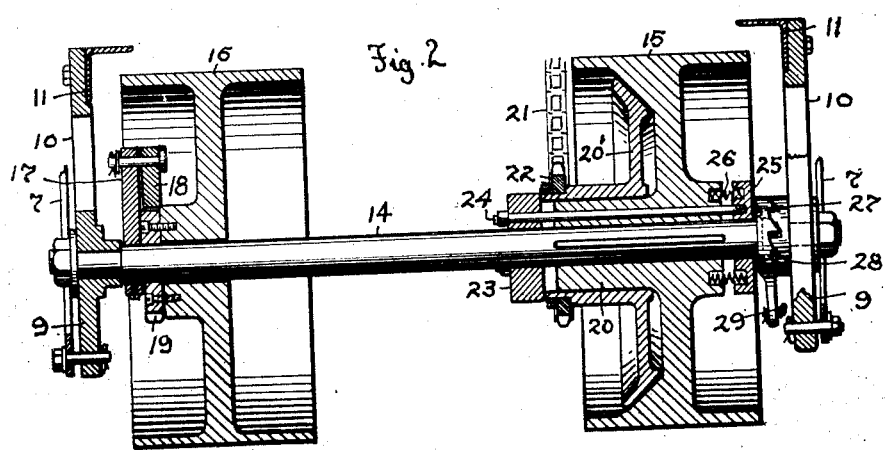
Figures 3, 4:
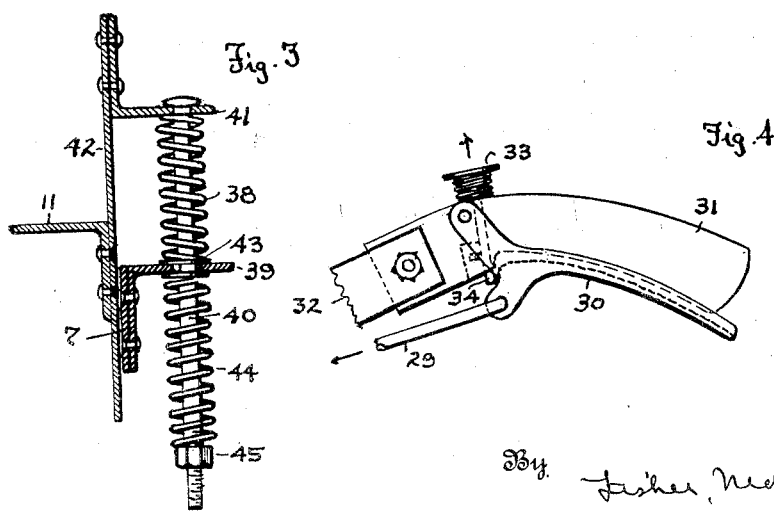

In the accompanying drawings, Fig. 1 is a perspective view on a reduced scale of my improved mowing machine in the hands of an operator. Fig. 2 is a sectional view of the propelling rollers and their driving parts. Fig. 3 is a sectional view of a part of the steering frame and one of the mower connecting bars, and showing the yielding or cushioning connections therebetween. Fig. 4 is a side view of the steering and throttle controlling handle. Fig. 5 is a side view of the machine, a portion of the handle being partly broken away and the hand grip brought nearer to the main body to permit the essential parts to be shown on a large scale, and Fig. 6 is a top view of the same assembly.

The mowing parts of the machine are the same or substantially the same as found in the push type of lawn mowers in general use, that is, they consist of a cutter bar 2, and a set of spiral cutting blades 3 mounted upon a cross shaft 3' which is driven at high speed by suitable gearing confined within a pair of tractional driving wheels 4. A suitable gear housing and trailer frame 5 carrying an idler roller 6 also forms part of the ordinary mowing mechanism, but the divided handle which is usually used and connected pivotally with each side of this frame, has been omitted. Instead, I pivotally attach a set of connecting bars 7 to the old pivot lugs 8 which extend inwardly from the housing or frame 5, and these bars may be curved upwardly and rearwardly and thence extend downwardly a substantial distance to permit a pivotal connection to be made with a downwardly extending arm 9 forming an integral or rigid part of a bracket 10 fixed to a skeleton frame 11 upon which a small gasoline engine 12 of any suitable kind or make may be mounted. Brackets 10 provide bearings for a drive shaft 14 (see Fig. 2) which is supported by a pair of broad-faced rollers 15 and 16, respectively. Roller 15 is keyed to the shaft, and the other roller 16 is free to rotate thereon but only in one direction as governed by an arm 17 fixed to the shaft and having a pawl 18 engaging the teeth of a gear or ratchet wheel 19 secured to the hub of said roller 16. A differential movement between the rollers may be obtained when said roller 16 is more rapidly rotated than roller 15 keyed to the shaft and such a differential movement permits short left turning movements of the machine under the guidance of the operator when traveling forward under power, and this arrangement also permits the machine to be drawn rearwardly with perfect freedom when the power is disconnected.

Roller 15 has a relatively long hub 20 upon which a disk clutch 20' is normally free to rotate but which may be shifted to frictionally engage the roller whenever power is to be transmitted from the engine by a sprocket chain 21, which chain meshes with a sprocket wheel 22 affixed to the clutch. A sliding collar 23 on shaft 14 bears against the clutch and one or more rods 24 extend through hub 20 and connect this collar with a thrust collar 25 at the outer side of the roller. A set of compression springs 26 placed between thrust collar 25 and the outer end of hub 20 serve to shift and hold clutch 20' in friction driving engagement with roller 15, and a rotatable cam member 27 is sleeved on shaft 14 opposite a fixed cam 28 on bracket 10, whereby when cam member 27 is turned by pulling a rod 29 the thrust collar 25 will be shifted to the left to offset the pressure of the springs and to release the clutch. Rod 29 is connected to a pivoted lever or handle 30 located beneath or at one side of the curved handles 31 of one of the handle bars 32 which extends rearwardly and upwardly at an inclination from one side of the rear end of frame 11, and a spring-pressed thumb-piece 33 mounted upon the top of handle 31 has a stem 34 extending through the handle where its lower end may be projected beyond the bottom of the handle into stop engagement with a shoulder on lever 30 whenever the operator desires to hold the clutch disengaged for any length of time. A second lever 36 mounted upon the handle at the opposite side of the machine has a wire connection 37 with the throttle of the engine, whereby the operation of the engine may be controlled.

The engine is mounted upon frame 11 above axle or shaft 14 and slightly in advance thereof so that the operator may easily tilt the entire frame and raise the mower unit by bearing down on the handles 31. On the other hand, in operations, the advanced position of the engine permits its weight to be utilized in part to maintain the wheels 4 of the mower in good tractional contact with the grass or ground, and a yielding pressure downwardly on the connecting bars 7 is obtained by supporting the front end of frame 11 upon a coiled spring 38 seated upon an angle iron bracket 39 affixed to each connecting bar 7. Spring 38 is sleeved upon a bolt 40 which is loosely suspended from another angle iron piece 41 riveted to an upright part 42 of frame 11. Bolt 40 extends through a large opening or slot 43 in bracket 39 which is riveted to bar 7, so that bar 7 may be free to move lengthwise within limits as well as vertically. A screw coiled spring 44 is sleeved over the lower end of bolt 40 and held under more or less tension against angle iron bracket 39 by an adjustable nut 45. The spring and bolt connection described provides a yielding connection at each side of the machine between frame 11 and connecting bars 7. As a result, part of the weight of the engine 12 and frame 11 is transferred to the mower frame at pivot lug 8 which is relatively near the axis of traction wheel 4, thereby obtaining a certain degree of tractional pressure for said wheels; and the independent spring connections at opposite sides of the frame permit the mower unit and the propelling unit to rise and fall and also to tilt laterally with respect to each other in traveling over obstructions, while thereby maintaining good tractional contact at opposite sides of the machine for the wheels of each unit. In addition the machine is capable of augmenting the traction pressure automatically whenever the forward travel of the mower unit is impeded or meets with resistance. For example, in cutting relatively high grass the mower unit presses the connecting bars 7 rearwardly in sufficient degree to transmit pressure to the lower end of the depending arm 9 of bracket 10 of the propelling unit, thereby tilting frame 11 on axle or shaft 14 so that the forward end of said frame bears down more heavily on the supporting springs 38 and connecting bars 7. The operator is thereby relieved of this duty and he may confine his efforts to guiding and controlling the movements of the machine, and the mower will crop the grass as closely for high grass as for low grass. The mower will also cut uniformly the length of the cutters in traveling over uneven surfaces because the spring connections will hold both wheels of the mower to the ground under the variable tilting movements of the two units. In operating the machine it may be permitted to advance very closely to an obstruction but the operator in guiding the machine has one hand engaged with lever 30 so that as he checks the forward movement of the machine he also grips the lever and throws out the clutch, thus stopping the driving mechanism and permitting him to pull the machine back without resistance. To facilitate ease of movement the axle and thrust collar may be provided with ball or roller bearings, not shown, as such bearings are well known in the arts.

What I claim, is:

1. A lawn mower, a frame mounted upon rollers, a motor upon said frame having driving connection with said rollers, side levers pivotally connecting said mower and frame for tilting movements in respect to each other, and springs supporting the front end of said frame yieldingly upon said levers.

2. A lawn mower having traction wheels, a tilting frame rearwardly of said mower having rollers and arms projecting downwardly beyond the axis of said rollers, bars pivotally connected with said arms and mower, and spring supporting means for the front end of said frame connected with said bars.

3. A lawn mower having traction driving wheels, a tilting frame mounted upon rollers, a motor upon said frame in driving connection with said rollers, bars pivotally connecting said mower and frame, and springs supporting one tiltable end of said frame upon said bars.

4. A lawn mower having traction wheels, a tilting frame having handles and traction rollers, a motor upon said frame in driving connection with said traction rollers, levers connecting said mower to a depending part of said frame adapted to effect tilting of the frame when the forward movement of the mower is retarded, and spring connections between said levers and tilting frame.

5. A lawn mower having a rotary cutter and traction wheels and a trailer frame carrying a cutter bar and an idler roller, in combination with a tilting frame, rollers and a motor on said tilting frame having power connections, forwardly-extending bars pivotally connecting the trailer frame of said mower with a depending part on said tilting frame below the axis of the tilting frame rollers, and cushioning means interposed between said bars and a part of said tilting frame.

6. A lawn mower frame having traction wheel, a separate frame mounted upon rollers, arms projecting downwardly from said separate frame, a motor upon said separate frame in driving connection with said rollers, bars pivotally connecting the mower frame with the arms on the separate frame, and spring means connecting the front end of said separate frame yieldingly to said bars to permit independent tilting movements between said frames.

7. A lawn mower, a frame tiltably mounted upon rollers, a motor upon said frame in driving connection with one of said rollers, push members pivotally connecting said mower with said tilting frame, and separate sets of opposed springs adapted to support the front end of said tiltable frame upon said members and to permit the mower to tilt transversely in respect to said frame.

8. A lawn mower, a tiltable frame mounted upon rollers having depending arms extending below the axis of the rollers, a motor mounted upon said frame in driving engagement with one of said rollers, bars connecting said arms to said mower, and the front end of said frame being connected to said bars but free to tilt in respect thereto.

9. A lawn mower having a trailing frame and idle roller, a cutter, and traction wheels adapted to drive said cutter, in combination with means for propelling and steering said mower and effecting traction for said mower wheels, comprising a tilting frame having handles, rollers carrying said frame, a motor and roller driving mechanism mounted on said frame, and push members connecting said mower with the rear end of said tilting frame and arranged to tilt said frame downwardly at its front end with pressure-applying effect upon said mower frame when the forward movement of the mower is retarded.

10. A lawn mower having traction wheels and a cutter, an independent tilting frame having handles, a roller supporting said frame, a motor mounted upon said frame in driving connection with said rollers, arched bars pivotally connecting said frame to the mower, and spring means connecting one end of said tilting frame yieldingly to the arched part of said levers.

In testimony whereof I affix my signature.

CARL H. MILLER.